Aug. 8, 1944.  W. J. KENNY  2,355,444
WELDING APPARATUS
Filed Nov. 7, 1942
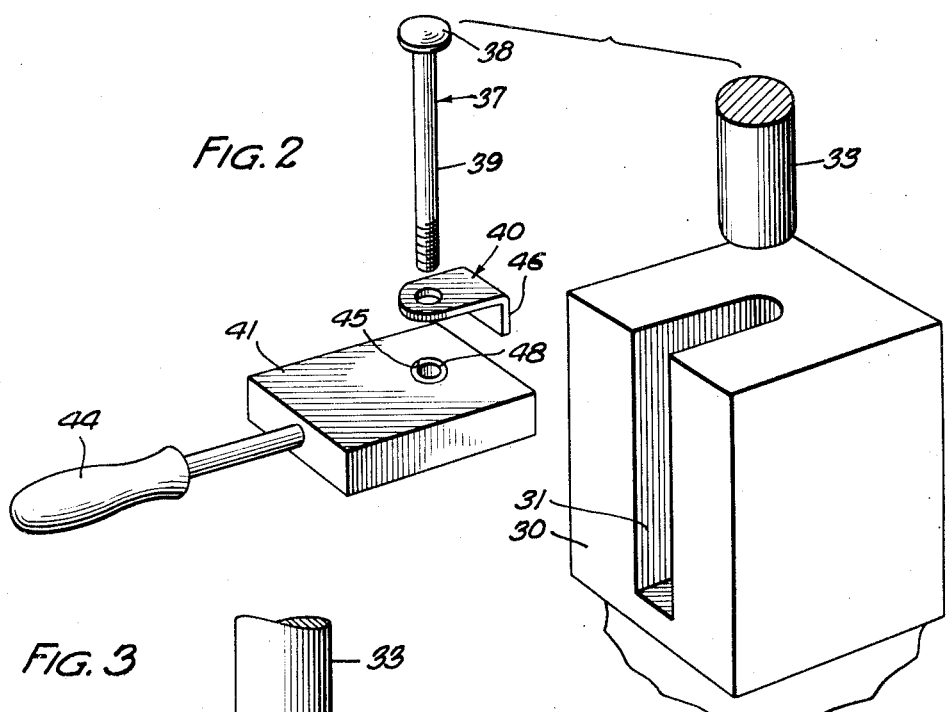
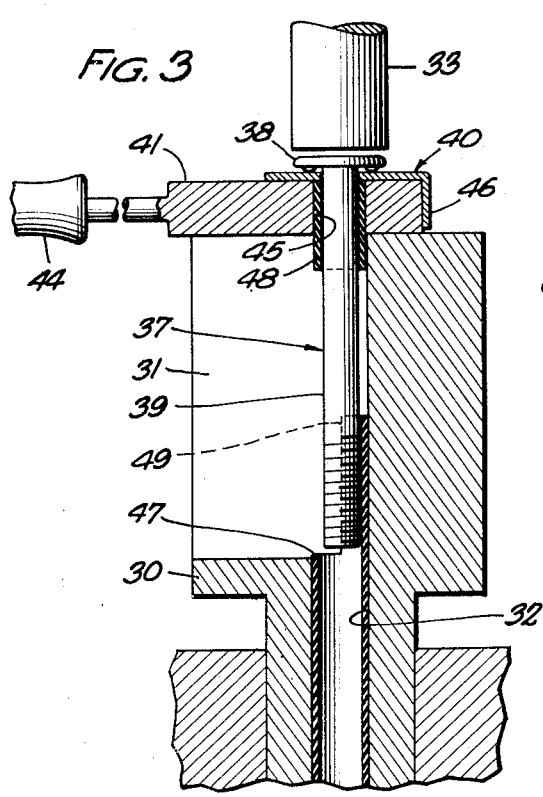
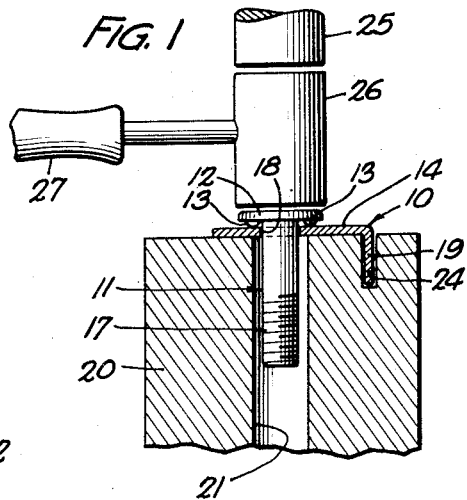
INVENTOR.
W. J. KENNY
BY Harry C. Duft
ATTORNEY Patented Aug. 8, 1944

2,355,444

UNITED STATES PATENT OFFICE 2,355,444

WELDING APPARATUS

William J. Kenny, Berwyn, Ill., assignor to Western Electric Company, Incorporated, New York, N. Y., a corporation of New York Application November 7, 1942, Serial No. 464,855

4 Claims. (Cl. 219—4)

This invention relates to welding apparatus and particularly to electrode extensions for welding apparatus and cooperating means for supporting work between the electrodes.

An object of the invention is the provision of efficient and practical electrode extensions and work supporting structures cooperating to facilitate the insertion of and withdrawal of parts to be welded together between the electrodes with a minimum operating stroke of the apparatus.

In accordance with one embodiment of the invention, as applied to resistance welding of angular shaped apertured brackets to the undersides of bolt heads, there is provided a stationary electrode having a slot for freely receiving one arm of the bracket while the other arm thereof is apertured for receiving the bolt shank, the latter bracket arm being welded to the underside of the bolt head. An aperture is provided in the electrode for freely receiving and holding the shank of the bolt, which may be of considerable length, the head thereof resting upon the bracket as a movable electrode is operated to complete the welding. In order to provide a desired short normal stroke to the latter electrode and at the same time to provide sufficient clearance between the electrodes for the purpose of removing the welded parts from the apparatus, an electrode extension having a handle is provided which is manually inserted between the movable electrode and the bolt head during each welding operation.

In an alternative embodiment of the invention, the stationary electrode is provided with a slot in its front face so that the bolt shank may be inserted laterally into position in the electrode. A combined article support and electrode extension having a handle is provided on which the bracket and bolt are first assembled and then manually inserted between the electrodes, the support being apertured to receive the bolt shank and the apertured bracket arm through which the bolt shank extends resting on the upper surface of the support while the other bracket arm abuts an end surface of the support. Thus, the desired normal short stroke of the movable electrode may be used for any length of bolt within the length of the slot of the stationary electrode.

Other objects and advantages of this invention will more clearly appear from the following detailed description, taken in conjunction with the accompanying drawing, in which Fig. 1 is a fragmentary vertical central section of a welding apparatus showing the features of one embodiment of the invention, the parts to be welded being shown mounted in position ready for a welding operation with the upper movable electrode about to descend to complete the welding operation;

Fig. 2 is a perspective view of another embodiment of the invention showing a support upon which the parts, shown in separated relation, are first assembled before inserting them between the electrodes; and Fig. 3 is a vertical central section through the embodiment illustrated in Fig. 2 showing the support and electrode extension with the assembled parts mounted upon the stationary electrode and the upper movable electrode about to descend to complete the welding operation.

In the accompanying drawing, the invention is illustrated as used in connection with a welding apparatus for effecting resistance welding of parts. Such apparatus in general may be of a well-known type and only such parts thereof which are necessary to a complete understanding of the present invention have been illustrated.

Referring now particularly to Fig. 1, which illustrates one embodiment of the invention as used to weld an angular shaped bracket 10 to a bolt 11 having a head 12, the underside of the bolt head 12 is formed with a plurality of embossed projections 13 which abut the upper surface of one arm 14 of the bracket 10 and provide welding areas at which the two parts are to be joined. A relatively long shank 17 of the bolt 11 extends through an aperture 18 in the bracket arm 14 and an arm 19 on the bracket is formed at right angles to the bracket arm 14 and extends downwardly along the bolt shank 17.

A lower normally stationary electrode, which may be adjusted vertically in a usual manner, is indicated at 20, upon which the bracket 10 and bolt 11 to be joined are supported during the welding operation, the bolt shank 17 being freely received in an aperture 21 of the electrode and the bracket arm 19 being freely entered in a slot 24, also formed in the electrode. An upper reciprocatory ram electrode is illustrated fragmentarily at 25 in alignment with the bolt 11.

It is desirable that the operating stroke of the reciprocatory ram electrode 25 be held to a desired normal minimum stroke in order to produce a maximum output from the apparatus in a given time. At the same time, it is necessary to provide sufficient clearance between the electrodes 20 and 25 when the latter electrode is in its retracted position in order to remove the welded bolt 11 and bracket 10 from the lower electrode 20, the relatively long length of the bolt shank 17 requiring a clearance distance equal to its length. This is accomplished in the present embodiment of the invention by providing an electrode extension 26 having a handle 27 which, in use, is manually inserted between the electrodes 20 and 25 in alignment with the bolt head 12 and upper electrode 25 during each welding cycle of the apparatus. Thus, a minimum normal stroke of the reciprocatory ram electrode 25 is maintained.

In the alternative embodiment of this invention, shown in Figs. 2 and 3, for use in the welding of angular shaped brackets to bolts, a lower normally stationary electrode 30, mounted for vertical adjustment in a usual manner, is formed with an opening or slot 31 in its front or left-hand face, as viewed in the drawing. The inner vertical wall of the slot 31 is semi-circular in conformation and aligned with a vertical aperture 32 which extends from the upper end face of the electrode for a suitable distance below the bottom wall of the slot 31. An upper reciprocatory ram electrode is shown fragmentarily at 33 in alignment with the lower electrode aperture 32, and the slot 31 therein is of such length that a relatively long bolt 37 having a head 38 and a shank 39 may be inserted laterally through the slot 31 into position in the lower electrode.

For use with this arrangement, there is provided a combined article support and electrode extension 41, having a handle 44, for supporting an angular shaped apertured bracket 40 and the bolt 37 to be welded thereto. The support and electrode extension 41 has an aperture 45 for receiving the bolt 37. In use, the bracket and bolt are first assembled upon the support and electrode extension 41 in the manner shown in Figs. 2 and 3, while positioned laterally of the electrodes 30 and 33. The bracket 40 has a right angle arm 46, which abuts the right end face (Fig. 3) of the combined support and electrode extension 41 when the bolt 37 and bracket are assembled thereon. Insulating sleeves 47 and 48 are arranged in the apertures 32 and 45, respectively, of the lower electrode 30 and combined support and electrode extension 41, the sleeve 47 being cut away, as indicated at 49, to permit the lateral movement of the bolt shank 39 into the lower electrode 30 to the position shown in Fig. 3. The sleeve 48, it will be noted (Fig. 3), extends below the lower face of the support and electrode extension 41. Thus, as the assembled bracket and bolt are manually moved laterally into the lower electrode 30, the lower portion of the sleeve 48 abuts the inner semi-circular wall of the slot 31, which serves as a stop surface for aligning the bolt head 38 with the upper reciprocatory ram electrode 33. The insulating sleeves 47 and 48 also serve to prevent contact of the bolt shank 39 with the lower electrode 30, which contact would prevent the desired high current concentration between the bracket and bolt head areas during the welding operation. If desired, the insulating sleeve 47 may be omitted and the inner vertical wall of the slot 31 and the aligned aperture 32 formed larger to provide an increased air space around the bolt shank 39. In such case, the diameter of the insulating sleeve 48 would be correspondingly greater.

The structural arrangement of the lower electrode 30, together with use of the combined bracket and bolt support and electrode extension 41, permits the operating stroke of the upper electrode 33 to be held to a minimum, since it is merely necessary to laterally withdraw the combined support and electrode extension from between the electrodes as the upper electrode moves a short distance to its retracted position. Thus, no abnormal operating stroke of the upper electrode is required to provide clearance to remove the relatively long bolt with the joined bracket from the apparatus. This adds to the efficiency of the welding apparatus for its results in a maximum output from the apparatus in a given time. The normal minimum stroke of the upper electrode may be used for any length of bolt within the length of the slot of the stationary electrode.

It will be understood that the embodiments herein described are merely illustrative of the invention and one application thereof and that modifications can be made and it is capable of other applications.

What is claimed is:

1. A combined article support and electrode extension for insertion between a stationary electrode and a movable electrode of a welding apparatus, the stationary electrode having a slot for laterally receiving a shank of a headed article for welding the head at its under side to an apertured article through which said shank extends, the article support and electrode extension comprising a member insertable between said electrodes having an opening for receiving said article shank extending through said apertured article, the latter article resting upon said member, said slot being of such length that a normal minimum stroke of the movable electrode may be maintained for any length of article shank within the length of said slot and permit the welded articles to be removed with the combined support and electrode extension.

2. A combined article support and electrode extension for insertion between a stationary electrode and a movable electrode of a welding apparatus, the stationary electrode having a slot for laterally receiving a shank of a headed article for welding the head at its under side to an apertured article through which said shank extends, the article support and electrode extension comprising a member having an aperture, an insulating sleeve in said aperture extending beyond one end thereof for receiving said article shank extending through said apertured article, the latter article resting upon a surface of said member at the opposite end of said sleeve, an inner wall of said stationary electrode slot effective as a stop surface for said insulating sleeve extension upon inserting said member between said electrodes, said slot being of such length that a normal minimum stroke of the movable electrode may be maintained for any length of article shank within the length of said slot and permit the welded articles to be removed with the combined support and electrode extension.

3. In a welding apparatus having relatively movable electrodes, a combined work holder and electrode extension comprising an apertured block of conducting material adapted to support parts to be welded and insertable between said electrodes, a portion of one of the parts to be welded being entered in and extending from the aperture, one of the electrodes having a slot for laterally receiving said portion of the part and a handle secured to said block.

4. In a welding apparatus having relatively movable electrodes, one of said electrodes having a slot for laterally receiving a shank of a headed article to be welded at the underside of its head to another article, a combined work holder and electrode extension comprising a block of conducting material shaped to receive the shank of the headed article, the other article being supported on the upper face of said block and the underside of the article head abutting the other article, and a handle secured to said block for carrying the parts assembled thereon into position between the electrodes and laterally inserting the shank of the headed article into the slotted electrode.

WILLIAM J. KENNY.